United States Patent

[11] 3,582,542

[72] Inventor Edward S. Smierciak
Fort Wayne, Ind.

[21] Appl. No. 028,213
[22] Filed Apr. 15, 1970
[45] Patented June 1, 1971
[73] Assignee International Telephone and Telegraph Corporation
Nutley, N.J.
Continuation of application Ser. No. 658,095, Aug. 3, 1967, now abandoned. This application Apr. 15, 1970, Ser. No. 028,213

---

[54] MULTIPLEXED, SEQUENTIAL DOT INTERLACED TELEVISION SYSTEM
14 Claims, 8 Drawing Figs.

[52] U.S. Cl. .......... 178/6.8, 178/69.5
[51] Int. Cl. .......... H04n 7/08
[50] Field of Search .......... 178/6 BWR, 7.7, 6.8; 328/6 TM, 63, 161; 179/15.5 BWR, 15 A; 325/38

[56] References Cited

UNITED STATES PATENTS

| | | | |
|---|---|---|---|
| 3,078,378 | 2/1963 | Burley et al. | 179/15A |
| 2,527,867 | 10/1950 | Schrader | 178/6TM |
| 2,677,721 | 4/1954 | Bedford | 179/15A |
| 2,870,247 | 1/1959 | Cherry | 179/15A |
| 3,042,751 | 7/1962 | Graham | 179/15A |
| 3,136,847 | 6/1964 | Brown | 178/6.8 |

*Primary Examiner*—Robert L. Griffin
*Assistant Examiner*—Donald E. Stout
*Attorneys*—C. Cornell Remsen, Jr., Rayson P. Morris, Percy P. Lantzy, Philip M. Bolton and Hood, Gust and Irish

---

ABSTRACT: A multiplexed sequential dot interlaced television system having a plurality of television cameras at the transmitting station with a common source of line and frame synchronizing signals supplying all of the cameras. A clock pulse generator is provided for generating a train of clock pulses having a frequency $$f_c=f_e n_2$$

where $f_e$ is the sampling signal frequency $$f_e=f_v(LD)/(n_1 n_2)$$

where $f_v$ is the frequency of the frame synchronizing signals, $L$ is the number of lines in one frame, $D$ is the number of clock pulses occurring during one line, $n_1$ is the vertical interlace ratio (if any), and $n_2$ is a predetermined dot interlace ratio, it being required that the quotient $LD/\ n_1 138\ n_2$ be irreducible and that there are no more cameras than the dot interlace ratio. A shift register is provided coupled to the clock pulse generator and having $n_2$ output channels, the shift register thus sequentially switching successive ones of the clock pulses to successive ones of its output channels so that a train of sampling pulses having a frequency $f_3$ is provided in each output channel of the shift register, these trains of sampling pulses being respective phase-displaced by the period of the clock pulse frequency $f_c$.

A plurality of sampling gates is provided respectively coupling the output circuits of the cameras to a video signal transmission facility, each of the sampling gates having a sampling signal output circuit which is coupled to a different output channel of the shift register. Each of the sampling gates thus passes a train of sampled video signals from the respective camera to the transmission facility, the trains of sampled video signals being multiplexed in the transmission facility by reason of the phase-displacement of the trains of sampling signals. The line and frame synchronizing signals are also applied to the transmission facility.

At the receiving station, a plurality of video monitors is provided equal in number to the cameras and each having line and frame sweep means and a video signal input circuit. A synchronizing signal detector circuit is coupled to the transmission facility for separating the line and frame synchronizing signals which are applied to all of the video monitors. Another clock pulse generator is provided which generates a train of clock pulses having a frequency $f_c$, this receiving station clock pulse generator being coupled to the synchronizing signal detector and synchronized with the clock pulse generator at the transmitting station by the separated line synchronizing signals. Another shift register is provided coupled to the receiving station clock pulse generator and also having $n_2$ channels. Another plurality of sampling gates is provided equal in number to the video monitors and respectively coupling the monitors to the transmission facility. Each of the receiving stations sampling gates has a sampling signal input circuit which is coupled to a different one of the receiving station output channels.

INVENTOR
EDWARD S. SMIERCIAK
BY Hood, Gust & Irish
ATTORNEYS

INVENTOR
EDWARD S. SMIERCIAK
BY Wood, Gust + Irish
ATTORNEYS

INVENTOR
EDWARD S. SMIERCIAK
BY Wood, Herron & Evans
ATTORNEYS

INVENTOR
EDWARD S. SMIERCIAK
BY Hood, Gust & Irish
ATTORNEYS

INVENTOR
EDWARD S. SMIERCIAK
BY Hood, Gust & Irish
ATTORNEYS

INVENTOR
EDWARD S. SMIERCIAK
BY Hood, Gust + Irish
ATTORNEYS

INVENTOR
EDWARD S. SMIERCIAK
BY Hood, Gust & Irish
ATTORNEYS

MULTIPLEXED, SEQUENTIAL DOT INTERLACED TELEVISION SYSTEM

REFERENCES TO RELATED APPLICATIONS

This case is a continuation of application 658,095, filed Aug. 3, 1967 now abandoned.

BACKGROUND OF THE INVENTION

1. Field of the Invention

This invention relates generally to sequential dot interlaced television systems, and more particularly to a multiplexed, sequential dot interlaced television system.

2. Description of the Prior Art

In conventional broadcast television, 30 complete frames are transmitted each second, each frame comprising 500 and 25 lines. With each line containing on the order of 400 picture elements, each of which can have many levels of brightness, i.e., black, greys and white, the transmission of conventional broadcast television pictures signals requires a transmission facility having a band width of approximately 4 megacycles. However, from an information standpoint, this television picture contains much more information than the human eye can possibly assimilate. Thus, due to the limitations of the human eye, television pictures can be presented containing less information without severe picture quality degradation.

It has been proposed, such as in U.S. Pat. No. 2,479,880 to P.M.G. Toulon and U.S. Pat. No. 3,136,847 to E.F. Brown, to reduce the band width required for television signal transmission by taking advantage of the psycho-physical characteristics of the human eye. In accordance with such proposals, a normal line-type television presentation is divided into a series of dots or elements, these dots being transmitted in a predetermined sequence, such as every second, fourth, eighth, 16th etc. dot. By thus transmitting these dots or elements in a sequential manner, a resulting image is generated containing sufficient information for the eye, by reason of its psycho-physical characteristics, to perceive the entire picture. The principal operation of dot interlacing is essentially the same as that employed in normal television for vertical interlacing of the horizontal scanning lines, the only difference being that the interlacing now takes place in a horizontal axis rather than in the vertical axis. The requirements for horizontal dot interlacing are expressed by the following equation $$f_e={}_v(LD)/(n_12).$$

The above equation defines the frequency of the dots or elements to be transmitted out of each line required for a dot interlaced ratio of $n_2$.

In certain existing closed circuit television systems, such as educational television systems, a single broad band channel is required for each circuit. There may however be a requirement for more than one monitor in each location with each monitor having a different display, e.g., in the case of educational television, the blackboard displayed on the A monitor, a demonstration on the B monitor, and the instructor on the C monitor. However, duplication of the broad band transmission facilities required for conventional closed circuit television systems is costly, entailing the installation of one or more additional coaxial cables or microwave radio channels.

SUMMARY OF THE INVENTION

The system of the present invention recognizes the fact that the employment of a sequential dot interlaced television system permits the multiplexing of a plurality of television channels, up to the sequential dot interlace ratio, on a transmission facility having the same band width as that ordinarily required for a single conventional television channel. Thus, in accordance with the broader aspects of the invention, a multiplexed, sequential dot interlaced television transmission system is provided having a plurality of camera means each including line and frame sweep means and video signal output circuit means for respectively providing time-based video signals. A common source of line synchronizing signals and a common source of frame synchronizing signals are provided respectively coupled to the line and frame sweep means of all of the camera means for respectively synchronizing the same. Video signal transmission means is provided and means is provided for generating a plurality of trains of recurrent sampling signals equal in number to the camera means and each having a frequency $f_e={}_v(LD)/(n_1n_2)$ where $f_v$ is the frequency of the frame synchronizing signals, $L$ is the number of lines in one frame, $D$ is the number of picture elements in one line, $n_1$ is the vertical interlace ratio (if any), and $n_2$ is a predetermined dot interlace ratio, the quotient $LD/n_1n_2$ being irreducible, there being no more camera means than $n_2$. Means are provided for coupling each of the camera means output circuits to the transmission means in response to a different one of the trains of sampling signals thereby to pass a train of sampled video signals from the respective camera means to the transmission means, the trains of sampling signals being respectively phase-displaced so that the sampled video signals are multiplexed in the transmission means.

At the receiving station, a plurality of video monitor means is provided equal in number to the camera means and each including line and frame sweep means and video signal input circuit means. A second common source of line and frame sweep synchronizing signals is provided coupled to the line and frame sweep means of all of the monitor means and means is provided for synchronizing the second source with the first-named source of synchronizing signals, Second means is provided for generating a plurality of second trains of recurrent sampling signals equal in number to the monitor means and having the same frequency and phase-displacement as the first-named plurality of trains of sampling signals. Second means is provided for coupling each of the monitor means input circuit means to the transmission means in response to a different one of the second trains of sampling signals.

It is accordingly an object of the invention to provide a multiplexed, sequential dot interlaced television system.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENT

Figure 1:
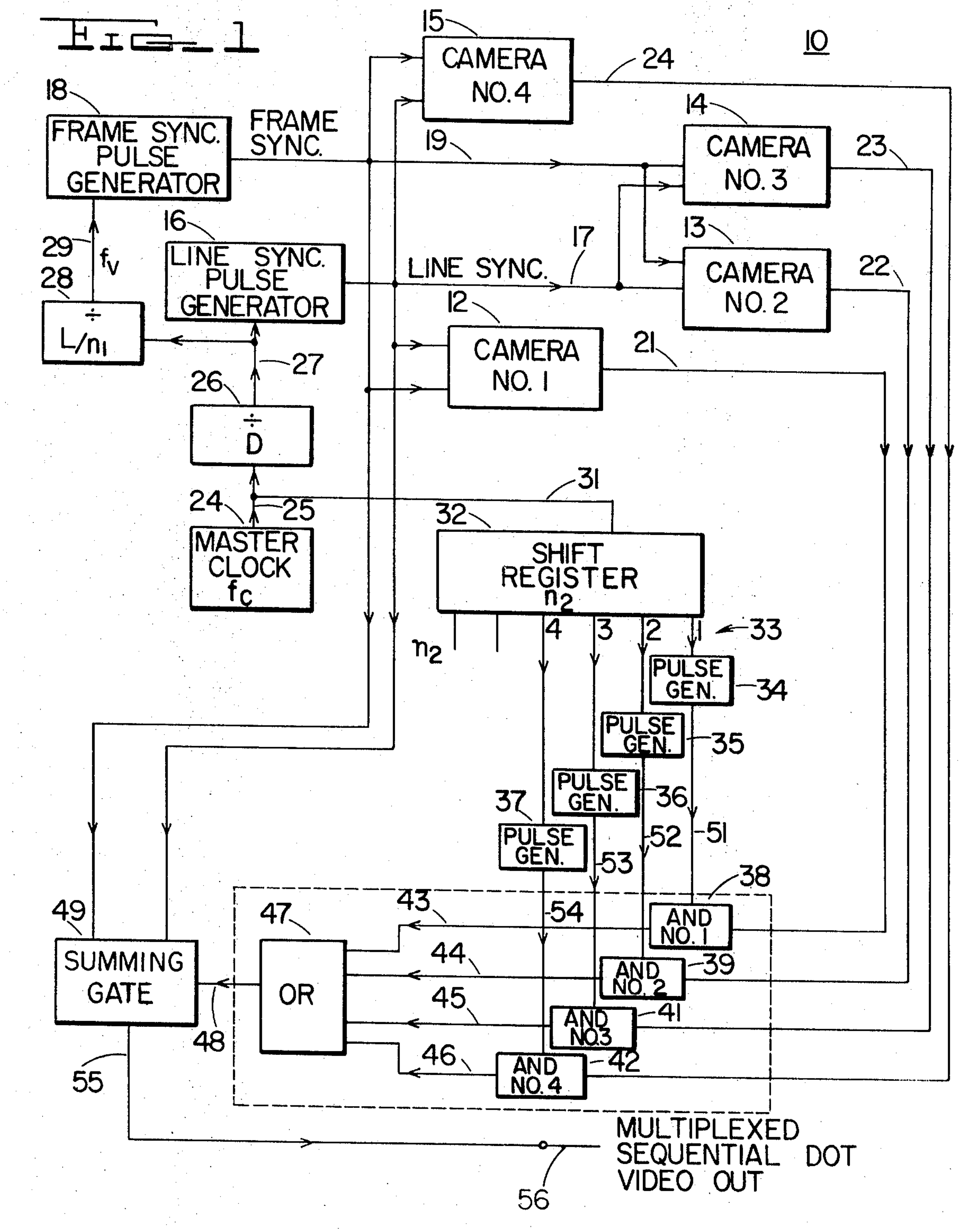
FIG. 1 is a schematic block diagram showing a transmitting station incorporating one embodiment of the multiplexed sequential dot interlaced television system of the invention.

Referring now to FIG. 1 there is shown a transmitting station, generally indicated at 10, incorporating one embodiment of the multiplexed, sequential dot interlaced television system of the invention. Four conventional television cameras 12, 13, 14 and 15 are shown, each having conventional horizontal and vertical (line and frame) sweep circuitry. A line synchronizing pulse generator 16 is provided coupled to all of the cameras by a common circuit 17 and a frame-synchronizing pulse generator 18 is also provided likewise coupled to all of the cameras, each of the cameras thus being synchronized by the same line and frame-synchronizing pulses. Cameras 12, 13, 14 and 15 respectively have video signal output circuits 21, 22, 23 and 24.

A master clock pulse generator 24 is provided which actuates the sequential dot interlacing and multiplexing system of the invention and also in the illustrated embodiment, is employed for actuating the line and frame-synchronizing pulse generators 16, 18. The general equation governing vertical line interlacing in a raster-type television display is:

$$f_h = {}_vL/N_1$$

where $f_h$ is the horizontal sweep frequency, $f_v$ is the vertical sweep frequency, L is the number of lines in a complete picture, and $n_1$ is the vertical interlace ratio, it being required for vertical interlacing to take place that the quotient $L/n_1$ 1 be irreducible, i.e., there being no common factors of the integers $L$ and $n_1$.

The requirement for horizontal dot interlacing is expressed by the equation:

$$f_e = {}_hD/N_2$$

where $f_e$ is the frequency of the elements or dots sampled line by line, $D$ is the total number of picture elements or dots in a horizontal line, and $n_2$ is the dot interlace ratio, it again being required that the quotient $D/n_2$ be irreducible. The frequency of the dots or elements, without sampling, i.e., the frequency of the master clock 24 is:

$f_c = {}_en_2$ and it will thus be seen that the horizontal sweep frequency $f_h = f_c/D$. Thus, in the illustrated embodiment, the output circuit 25 of the master clock is coupled to a conventional dividing circuit 26 which divides the frequency $f_c$ of the clock pulses generated by the master clock 24 by $D$, i.e., the total number of dots or elements in a single line, and it in turn has its output circuit 27 coupled to the line synchronizing pulse generator 16 for actuating the same. Output circuit 27 of the divider 26 is likewise coupled to a conventional dividing circuit 28 which divides the horizontal sweep frequency $f_h$ by $L/n_1$ to provide the vertical sweep frequency $f_v$ in the output circuit 29 which is coupled to the frame synchronizing pulse generator 18 for actuating the same.

In a specific embodiment of the system shown in FIG. 1 in which there is no vertical interlacing, i.e., $n_1$=l and the vertical sweep frequency $f_v$ is 60 cycles per second, there being 161 lines per frame ($L$), 161 elements or dots per line ($D$) and a dot interlace ratio $n_2$ of 4, the master clock pulse generator 24 will provide a train of clock or timing pulses having a frequency $f_c$ of 1,555,260 cycles per second, dividing circuit 26 will divide the clock pulses by 161 to provide a horizontal sweep frequency $f_h$ of 9,660 cycles per second, and dividing circuit 28 will divide the horizontal sweep frequency $f_h$ by 161 to provide the vertical sweep frequency $f_v$ of 60 cycles per second.

Output circuit 25 of the master clock pulse generator 24 is coupled to the input circuit 31 of a conventional shift register 32 having $n_2$ output channels, it being a further requirement of the system that there may be no more cameras than the dot interlace ratio, i.e., $n_2$. In the illustrated embodiment in which the dot interlace ratio $n_2$ is chosen to be 4, shift register 32 is provided with four output channels 33–1, 33–2, 33–3 and 33–4. It will be readily understood that the shift register 32 sequentially switches each successive pulse generated by the master clock pulse generator 24 to a different one of the output channels 33. Thus, the first pulse of the train of clock pulses will appear in the first output channel 33–1, the second pulse will appear in the second output channel 33–2, the third pulse in the third output channel 33–3, the fourth pulse in the fourth output channel 33–4 and the fifth again in the first output 33–1, and so on, as in well known to those skilled in the art. It will thus be seen that there is provided in each of the output channels 33 of the shift register 32 a train of sampling pulses having a frequency $f_e = f_c/n_2$, these four trains of sampling pulses being respectively phase-displaced by the period of the clock pulses $f_c$.

Four sampling pulse generators 34, 35, 36 and 37 are provided respectively having their input circuits coupled to the output channels 33–1, 33–2, 33–3 and 33–4 of the shift register 32. Four analog type AND gates 38, 39, 41, 42 are provided to which the output circuits 21, 22, 23 and 24 of the cameras 12, 13, 14 and 15 are respectively coupled. The output circuits 43, 44, 45 and 46 of the AND gates 38, 39, 41, 42 are respectively coupled to OR circuit 47 which has its output circuit 48 coupled to summing gate 49.

Each of the AND gates 38, 39, 41 and 42 has its gating signal circuit 51, 52, 53 and 54 coupled to the output circuit of a respective sampling pulse generator 34, 35, 36, 37 and is actuated in response to the train of sampling pulses generated thereby. Line and frame synchronizing signal circuits 17 and 19 are also coupled to the summing gate 49 which has its output circuit 55 coupled to a conventional transmission facility 56 which may be a coaxial line or a microwave radio facility.

It will now be seen that each of the AND gates 38, 39, 41 and 42 passes from the respective camera 12, 13, 14, 15 to the OR gate 47 and to the transmission facility 56 a train of sampled video signals having a frequency $f_e = f_c/n_2$, these trains of sampled video signals being phase-displaced by the period of the clock pulses $f_c$ by the shift register 32 and thus multiplexed on the transmission facility 56.

Figure 2:
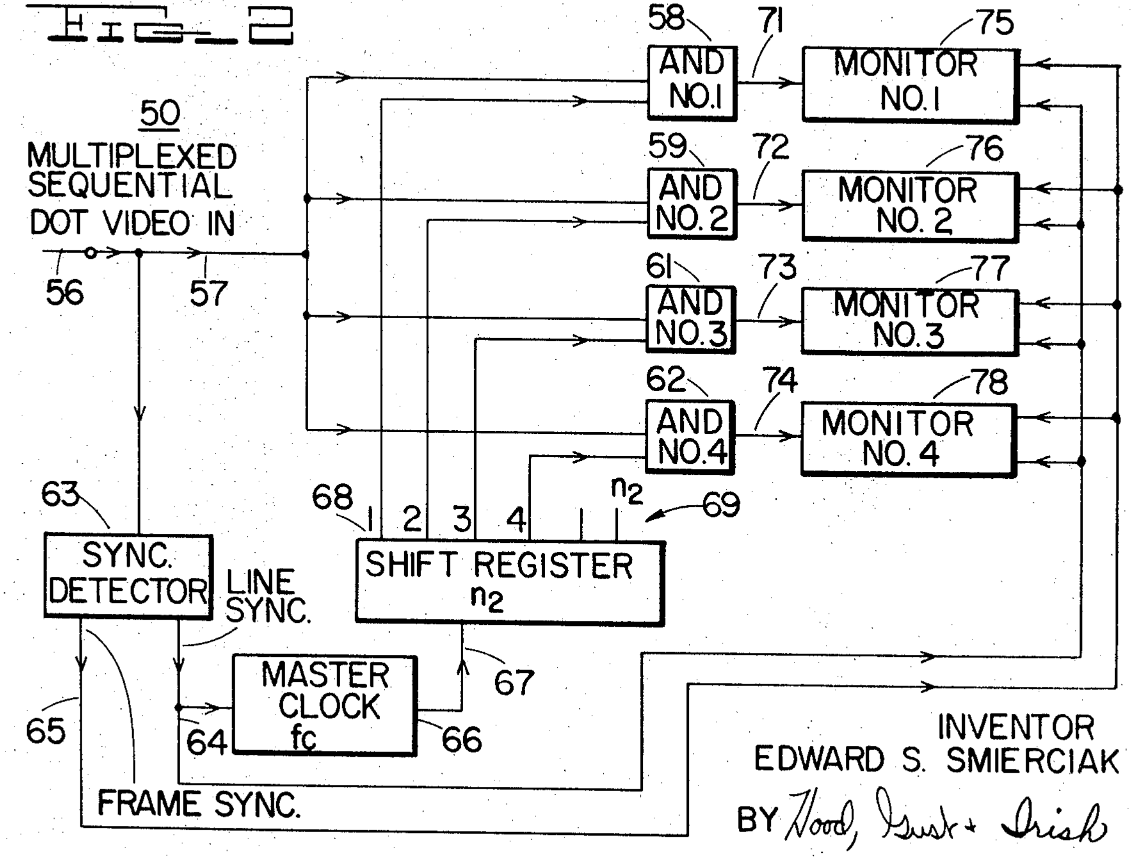
FIG. 2 is a schematic block diagram illustrating one embodiment of a receiving station for use with the multiplexing system of FIG. 1.

Referring now to FIG. 2, at the receiving station, generally indicated at 50 it is required that the particular video signal output associated with a particular camera be routed to a specific monitor. Thus, the receiving end of the transmission facility 56 is coupled to input circuit 57 which, in turn, is coupled to "AND" gates 58, 59, 61 and 62. Input circuit 57 is also coupled to a conventional synchronizing signal detector and separator 63 which detects and separates the line and frame synchronizing pulses in its output circuits 64, 65. Another master clock pulse generator 66 having a frequency $f_c$ is provided coupled to the line synchronizing pulse output circuit 64 of the sync. pulse detector and separator 63 and synchronized by the line synchronizing pulses. The receiving station master clock 66 has its output circuit 67 coupled to another conventional shift register 68, again having $n_2$ output channels 69. Again, in the illustrated embodiment in which the dot interlace ratio $n_2$ is 4, shift register 68 is provided with four output channels 69–1, 69–2, 69–3 and 69–4 respectively coupled to the gating signal input circuits of the analog type AND gates 58, 59, 61 and 62. The four output circuits 71, 72, 73 and 74 of the AND gates 58, 59, 61 and 62 are respectively coupled to four conventional video monitors 75, 76, 77 and 78 which respectively receive their line and frame synchronizing signals from the output circuits 64, 65 of the synchronizing signal detector and separating circuit 63.

It will be readily understood that the multiplexing system as shown in FIGS. 1 and 2 may be used with any number of cameras and monitors up to the interlace ratio, i.e., up to 4 cameras and monitors in the case of an interlace ratio 4:1. It will further be seen that the multiplexing of additional cameras and monitors can be employed with higher interlace ratios.

Figure 3:
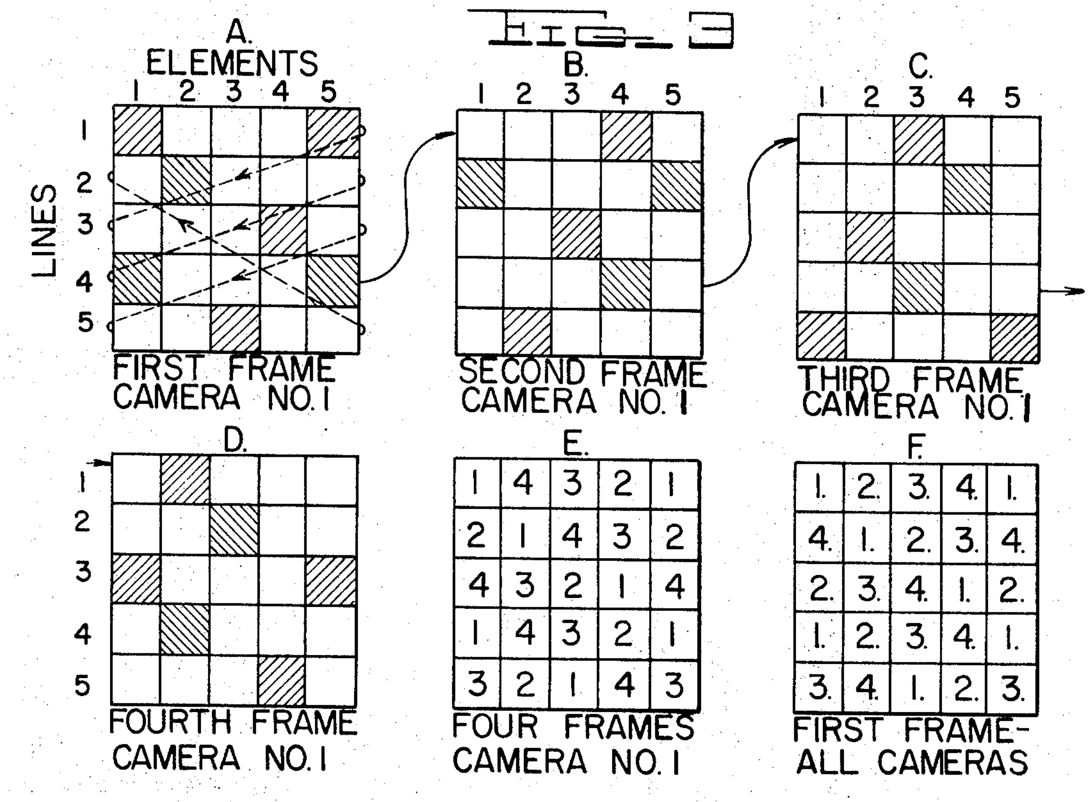
FIG. 3A—F are diagrams showing a simplified five line by five element television image with a 2:1 vertical interlace and a 4:1 sequential dot interlace, useful in explaining the invention.

Referring now particularly to FIG. 3A–E, in order to understand the manner in which video elements are extracted from a line-type television signal, interlaced, and displayed in the multiplexed sequential dot interlace system of the invention, an arbitrary five-line television picture is shown with each line arbitrarily divided into five elements, this simplified five line by five element diagram being equivalent to an incremental portion of a complete 525 line television image having a vertical interlace ratio of 2:1 and a sequential dot interlace ratio of 4:1. FIG. 3A shows, in dashed lines, the scanning path followed by the beam of the camera tube No. 1 (12 in FIG. 1), and also by the beam of the monitor tube No. 1 (75 in FIG. 2). It will be observed that the scanning beam starts its scan on the first element of the first line, scanning horizontally to the fifth element, the beam then scanning horizontally across lines 3 and 5 and then returning to scan lines 2 and 4 in accordance with the conventional vertical interlace system employed in broadcast television.

FIGS. 3A–D show the particular elements shaded in each frame which are displayed in a 4:1 sequential dot interlace system in which every fourth element is transmitted and displayed. Thus, considering first FIG. 3A, starting with the first element on the first line, first frame, and taking every fourth element of the scanning path shown, it will be observed that the first and fifth elements in the first line are transmitted and received by the camera tube No. 1 and monitor No. 1, respectively, followed by the fourth element of the third line, the third element of the fifth line, the second element of the second line, and the first and fifth elements of the fourth line. When the fourth line of the first frame has been scanned, the first frame has been completely scanned and scanning of the second frame commences with every fourth element selected as shown. The third and fourth frames are then scanned with every fourth element being transmitted and received by the camera tube No. 1 and monitor No. 1, respectively, as indicated by the shaded elements.

Referring now to FIG. 3E, the numbers in the video element spaces refer to the frame during which the corresponding element was transmitted and displayed by camera No. 1 and monitor No. 1, respectively, and it will be seen that after four complete frames, all of the video elements have been transmitted and displayed. Thus, considering the first line of the displayed image, the first and fifth elements were transmitted in the first frame, the second element in the fourth frame, the third element in the third frame and the fourth element in the second frame.

Referring now again to FIG. 3A, it will be seen that the first line scanned by the beam of camera No. 1 is divided into five elements or dots but that a video signal is transmitted only during the first and fifth elements, no signal being transmitted during the intervening second, third and fourth elements. Thus, a video signal from camera No. 2 may be transmitted during the second element, a video signal from camera No. 3 transmitted during the third element, and a video signal from camera No. 4 transmitted during the fourth element of the first line of camera No. 1. It will likewise be seen that the video signal provided by camera No. 1 during the first and fifth elements may be routed to monitor No. 1, the video signal transmitted during the second element routed to monitor No. 2, the video signal transmitted during the third element routed to monitor no. 3 and the video signal transmitted during the fourth element routed to monitor No. 4.

Reference to FIG. 3F will now reveal that with four cameras and monitors respectively scanned in synchronism and with sequential dot interlacing with the same interlace ratio applied to each camera and monitor, by phase-displacing the sample video signals from each camera, the sequential dot signals from each camera, the sequential dot signals from each respective camera can be transmitted and received by a respective monitor during an incremental period of time during which no signal is being transmitted by any other camera.

It will now be readily seen that the master clock pulse generators 24, 66 at the transmitting and receiving stations shown in FIGS. 1 and 2, respectively, establish the line elements and that the shift registers 32, 68 provide the sequential dot interlacing for each camera and monitor, respectively, and also the requisite phase-displacement between the respective video signals.

Figure 4:
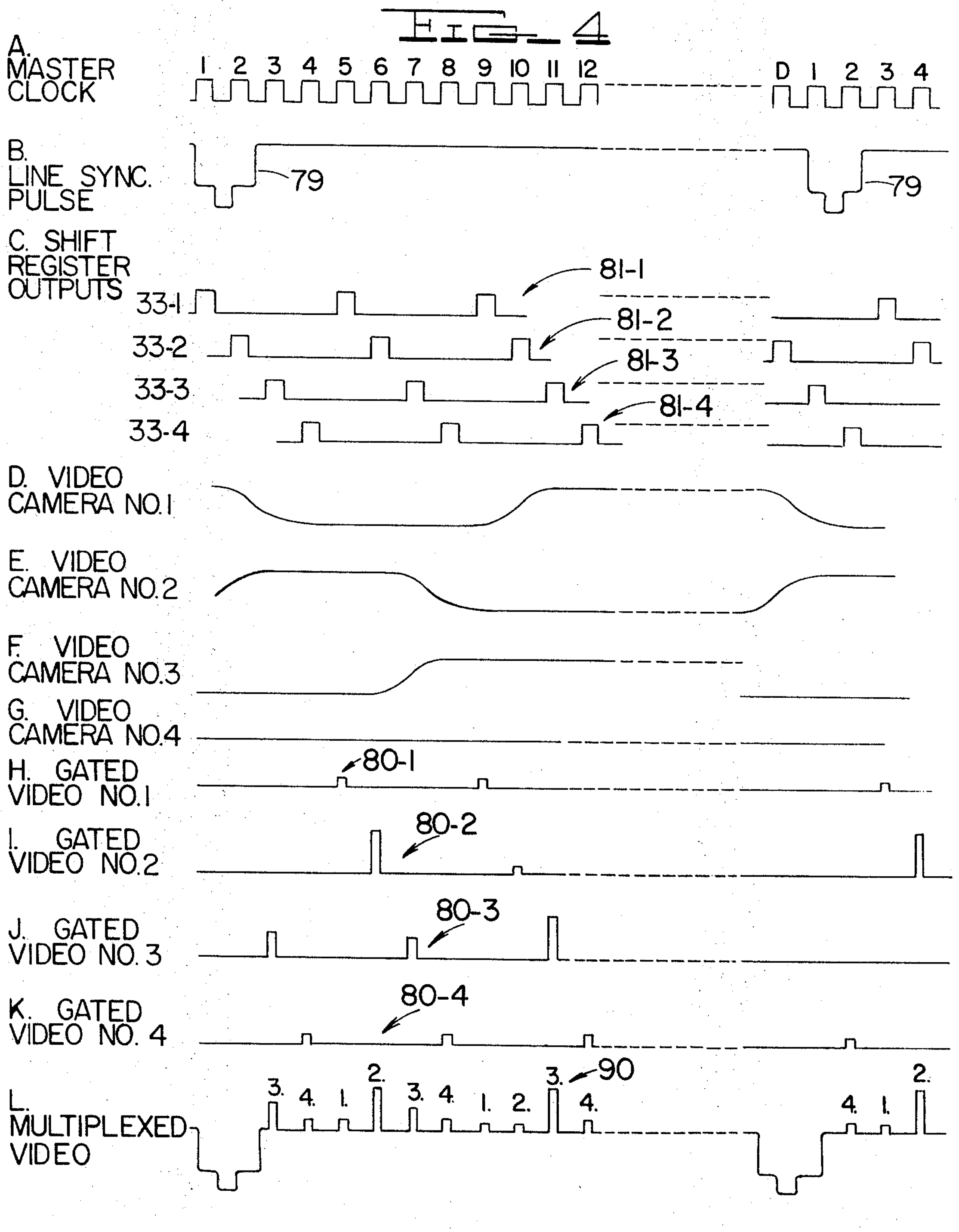
FIG. 4A—L are timing diagrams useful in explaining the multiplexed sequential dot television system of FIG. 1.

Referring now to FIG. 4A, there is shown the clock pulses which, in the illustrated embodiment, are continuously generated by the respective clocks 24, 66, while FIG. 4B shows at 79 the line sync pulses provided by the dividing circuit 26 and line sync pulse generator 16 in response to every D master clock pulses. Referring to FIG. 4C, it will be seen that the shift registers 32, 68, by sequentially switching successive ones of the master clock pulses to the respective output channels 33–1, 33–2, 33–3, 33–4, and 69–1, 69–2, 69–3, 69–4 provides a train of pulses 81–1, 81–2, 81–3, and 81–4 in their respective output channels, each train having a frequency $f_e = f_c/n$, the trains of pulses being respectively phase-displaced by the period of the master clock pulses.

Referring to FIG. 4D, E, F & G, four typical video signal outputs from the four cameras 12, 13, 14 and 15 are shown, these video signals being respectively applied to the AND gates 38, 39, 41 and 42. It will be understood that the four AND gates 38, 39, 41 and 42 are opened or gated "ON" only when a gating signal is applied to the respective gating signal input circuit 51, 52, 53, 54. The gate pulse generators 34, 35, 36, 37 respectively provide narrow gating pulses in response to the trains of sampling pulses 81–1, 81–2, 81–3 and 81–4 these corresponding trains of gating pulses being respectively applied to the four AND gates.

Referring now to FIGS. 4H, I, J & K, it will be seen that a train 80–1 of video signal pulses is provided in output circuit 43 of AND gate 38, which have been sampled from the video signal provided in output circuit 21 of camera 12 in response to the train 81–1 of sampling pulses provided in output channel 31–1 of shift register 32 (and the corresponding train of narrow gating pulses provided by pulse generator 34). Likewise, it will be seen that trains 80–2, 80–3, 80–4 of video signal pulses are provided in output circuits 44, 45 and 46 of AND gates 39, 41, 42 sampled from the video signals provided in output circuits 22, 23 and 24 of cameras 13, 14 and 15, respectively, in response to the phase-displaced trains of sampling signals 81–2, 81–3 and 81–4 provided in the output channels 33–2, 33–3 and 33–4, respectively, of the shift register 32.

Referring now finally to FIG. 4L, it will be seen that the individual trains of sampled video signal pulses appearing separately in output circuits 43, 44, 45 and 46 of the AND gates 38, 39, 41 and 42 are combined by the OR circuit 47 and applied to the output circuit 55 and transmission facility 56, thereby providing a multiplexed, sequential dot interlace video signal 90.

At the receiving station 55, the master clock pulse generator 66, shift register 68 and AND gates 58, 59, 61 and 62 resample the incoming video signal received at the input circuit 57 and respectively route the respective trains of sampled video signals to the corresponding monitor. Thus recalling that the master clock pulse generator 66 is synchronized with the master clock pulse generator 24 at the transmitting station, application of the train of sampling pulses appearing in the output channel 69–1 of the shift register 68 will sequentially actuate the AND gate 58 to pass the train of sampled video signals which originate with camera No. 1 (12) to monitor No. 1 (75) and so forth.

In application Ser. No. 636,060 filed Mar. 15, 1967, by the present inventor and assigned to the present assignee, there is described and illustrated a system and method of sequential dot interlacing which recognizes the fact that the only real requirement for dot interlacing is that the number of elements or dots in each line be the same number D. Each line has a usable or information-conveying signal portion which occurs between successive line synchronizing pulses, and in order to provide sequential dot interlacing, it is only necessary that this information-conveying signal portion be divided into $D$ elements or dots which, in turn, are sampled with the ratio $n_2$, i.e., every fourth, sixth, eighth, etc. dot. Thus, in accordance with the system and method of the aforesaid application Ser. No. 636,060, what is referred to as a quasi line is established which contains the exact predetermined number $D$ of interlace elements, this "quasi" line in all cases having a duration shorter than the minimum duration or interval of the usable portion of each line.

Figure 5:
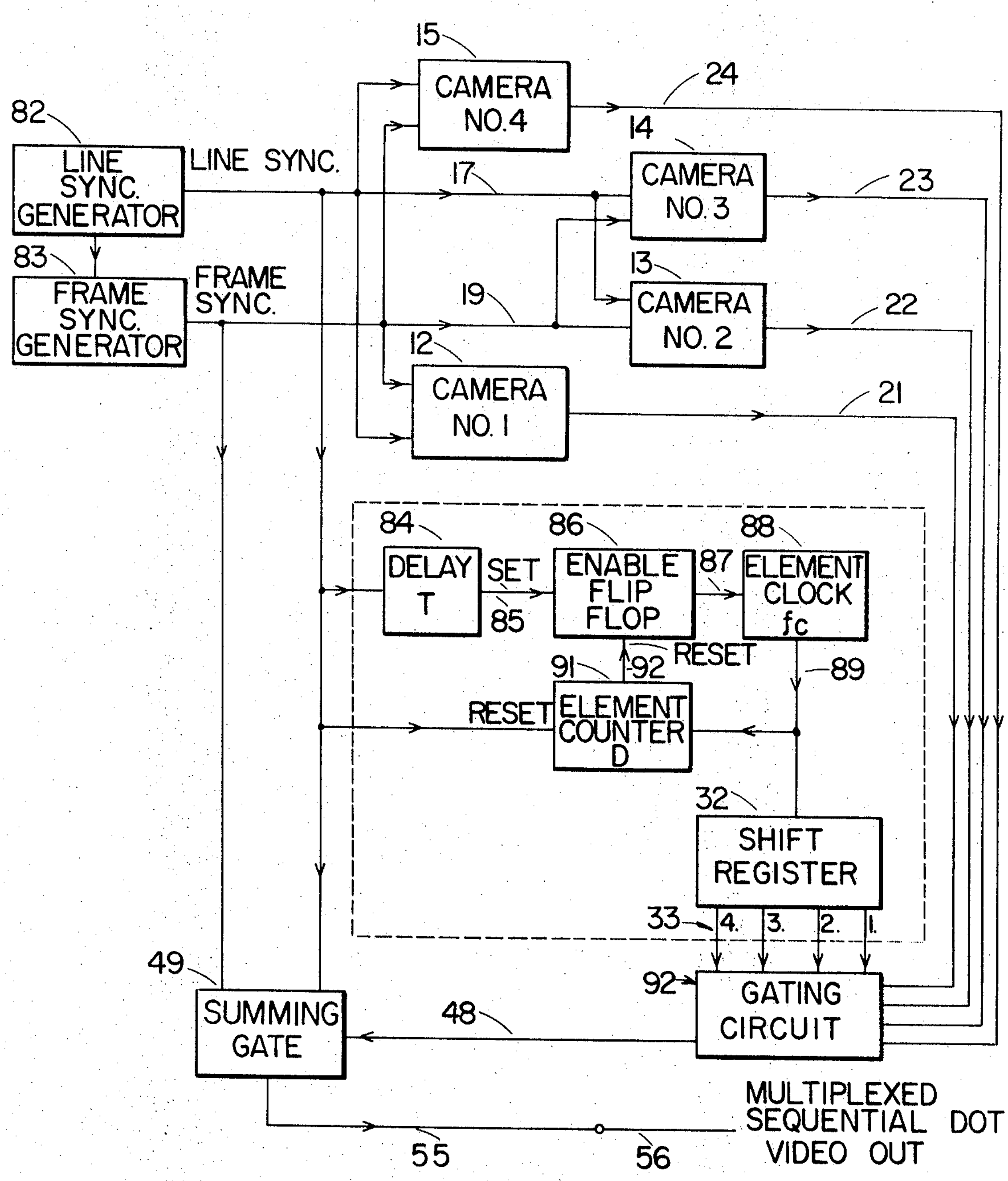
FIG. 5 is a schematic block diagram showing a transmitting station incorporating the preferred embodiment of the multiplexed sequential dot interlaced television system of the invention.
Figure 7:
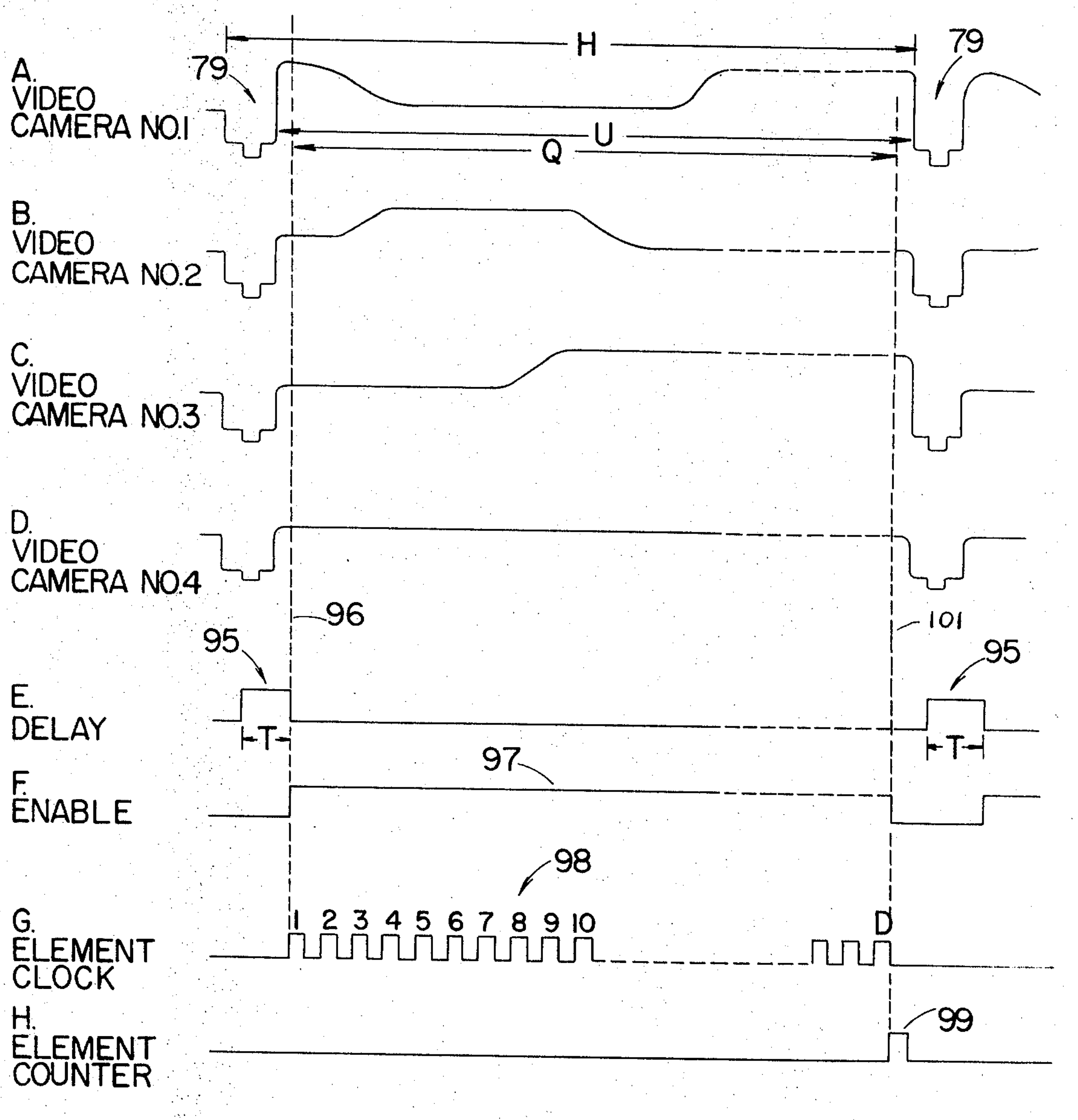
FIG. 7A—I are timing diagrams useful in explaining the system of FIg. 5.

Referring now to FIG. 5 in which like elements are indicated by like reference numerals, in this embodiment the interlace frequency is controlled independently of the line frequency $f_h$ and the frame frequency $f_v$ and thus, conventional positive interlace type line and frame synchronizing pulse generators 82, 83 are provided respectively supplying line and frame synchronizing signals to all of the cameras 12, 13, 14, 15 by circuits 17 and 19, respectively, the line and frame synchronizing pulse generators 82, 83 not being directly synchronized with the clock pulse generator 88 which establishes the elements in each line. The line sync pulse output circuit 17 is coupled to a conventional delay circuit 84, which may be a conventional monostable multivibrator, which generates a time delay pulse in response to each line sync pulse, the delay pulse terminating after termination of the respective line sync pulse although this delay is not necessary. Output circuit 85 of the delay circuit 84 is coupled to the "-set" circuit of a conventional enable flip-flop circuit 86 which generates an enabling signal in its output circuit 87. The enabling signal in output circuit 87 actuates a conventional clock pulse generator 88 which generates the train of clock pulses having the frequency $f_c$, the period of which corresponds to the elements or dots in each line. The frequency $f_c$ of the clock pulse generator 88 is set so that the requisite number $D$ of clock pulses are generated during the interval Q (FIG. 7) between successive line synchronizing pulses 79.

The clock pulses generated by the clock pulse generator 88 appear in its output circuit 89, which is coupled to a conventional pulse counting circuit 91, which counts down the clock pulses and provides a signal in its output circuit 92 when the desired number $D$ of clock pulses have been generated. Output circuit 92 of the element counter 91 is coupled to the "reset" circuit of the enable flip-flop 86 thereby terminating the enabling signal and stopping the clock pulse generator 88.

It will thus be seen that the delay circuit 84 and enable flip-flop circuit 86 insure that the clock pulse generator 88 is started at the same time on each line, the element counter 91 and enable flip-flop 86 further insuring that the clock pulse generator 88 s stopped when exactly the prescribed number D of pulses have been generated. The element counter 91 is reset by the respective line synchronizing pulse 79 at the beginning of each line, line-sync. output circuit 17 being coupled to the "reset" circuit of the element counter 91.

Output circuit 89 of the clock pulse generator 88 is also coupled to the shift register 32. The four output channels 31–1, 33–2, 33–3 and 33–4 of the shift register 32 are again coupled to pulse generators 34, 35, 36, 37 which in turn are coupled to the AND gates 38, 39, 41 and 42, which couple the output circuits 21, 22, 23 and 24 of the cameras 12, 13, 14 and 15 to the OR gate 47, collectively shown schematically as gating circuit 92 in FIG. 5.

Figure 6:
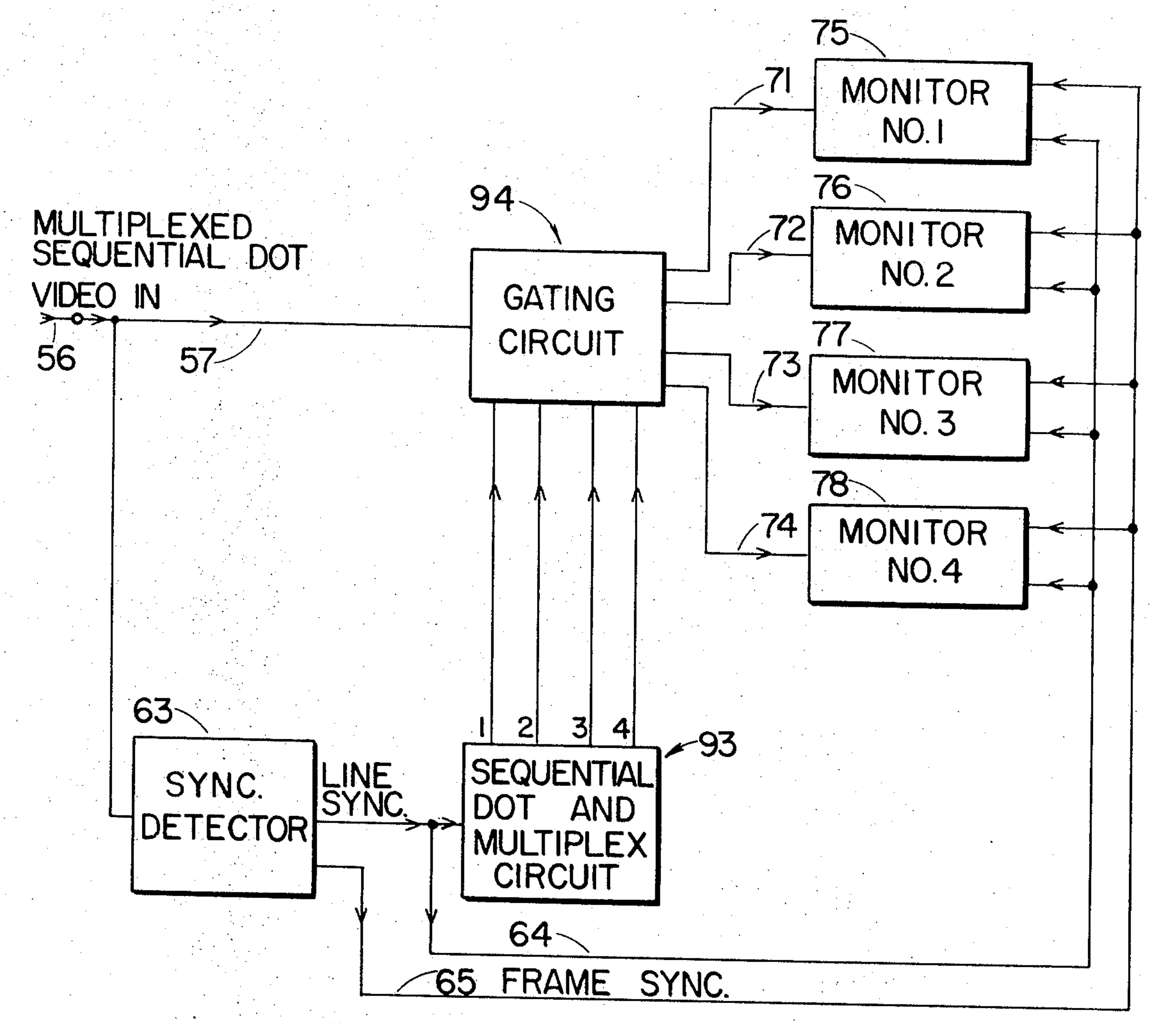
FIG. 6 is a schematic block diagram showing a receiving station for use with the transmitting station of FIG. 5.

Referring now to FIG. 6 in which like elements are again indicated by like reference numerals, the synchronizing pulse separator and detector circuit 63 is again coupled to the input circuit 57 with its line and frame sync pulse output circuits 64, 65 again being coupled to all of the monitor 75, 76, 77, 78. Here, the line sync output circuit 64, which corresponds to the line sync output circuit 17 of the transmitting station (FIG. 5) is coupled to another sequential dot multiplex circuit, generally indicated at 93, which includes the delay 84, enable flip-flop 86, element clock 88, element counter 91 and shift register 32, the output channels of the shift register being coupled to actuate the AND gates 58, 59, 61 and 62 (FIG. 2), collectively schematically shown as the gating circuit 94 in FIG. 6.

Referring now to FIG. 7A, there is shown a typical video signal provided by camera No. 1 (12) including successive line-synchronizing pulses 79. Here, the total duration of one line from one line-synchronizing pulse to the next is indicated as H and the usable video signal portion between successive line-synchronizing pulses is indicated as U.

Referring to FIG. 7B, *C* & *D*, typical video signals from the other cameras No. 2, 3 and 4 (13, 14 and 15) are also shown.

Referring now to FIGS. 7E, delay circuit 84 provides a time delay pulse 95 in response to each line-synchronizing pulse 79, each pulse 95 having a duration T and terminating following termination of the respective line-synchronizing pulse 79, as shown at 96. Referring to FIG. 7F, termination of the delay pulse 95 actuates the enable flip-flop 86 to generate the enabling signal 97 which actuates the clock pulse generator 88 to initiate the train 98 of clock pulses, as shown in FIG. 7G. The element counter 91 counts down the train of clock pulses 98 and when the number D has been reached, reset pulse 99 is provided (FIG. 7H) which is applied to the enable flip-flop 86 to terminate the enable signal 97, as at 101, thus establishing the "quasi" line Q (FIG. 7A) within the usable signal portion U of each line during which the requisite number $D$ of clock pulses are generated.

As indicated, the train of clock pulses 98 is applied to the shift register 32 which functions to provide the sequential dot interlacing and multiplexing in the same manner as in the embodiment of FIGS. 1 and 2.

Figure 8:
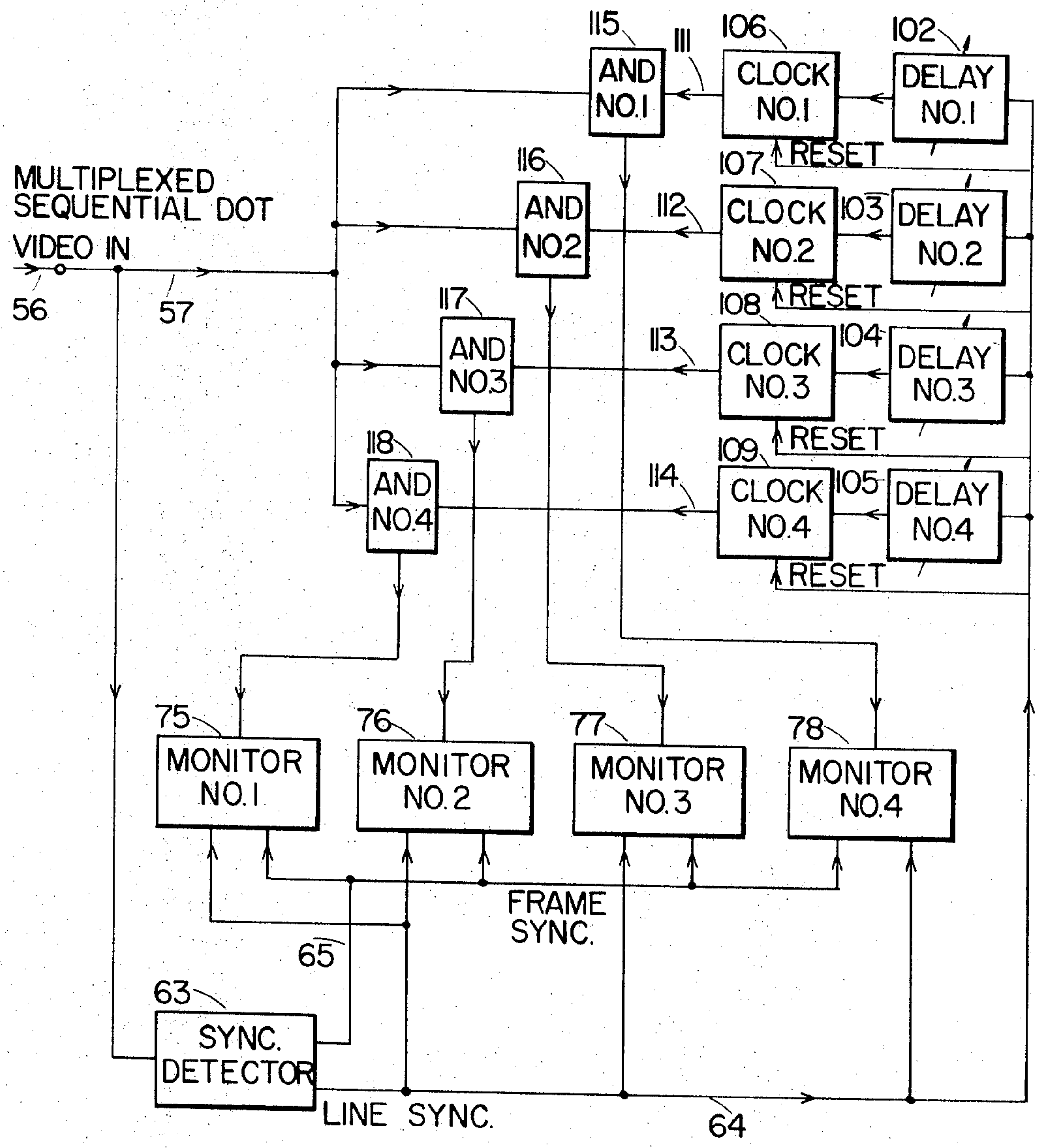
FIG. 8 is a schematic block diagram showing another embodiment of the receiving station for use with the multiplexing system of FIG. 5.

The sequential dot interlace multiplex-receiving system shown in FIG. 6 is restricted in that each particular monitor is necessarily associated with a respective particular camera. Referring now to FIG. 8, in which like elements are still indicated by like reference numerals, another receiving station system is shown which will permit any of the incoming multiplexed video signals to be displayed by any of the monitors. Here, the detected and separated line sync pulses appearing in the output circuits 64 of the sync detector 63 are coupled to four selectively adjustable delay circuits 102, 103, 104 and 105 which respectively trigger clock pulse generators 106, 107, 108, 109, each generating a train of pulses having the frequency $f_e$, i.e., the sampling pulse frequency. The output circuits 111, 112, 113, 114 of the clock pulse generators 106-—109 are respectively coupled to the gating signal input circuits of AND gates 115, 116, 117, 118. The AND gates 115-—118 respectively couple input circuit 57 to the video signal input circuits of the monitors 75, 76, 77 and 78.

The selectively adjustable delay devices 102, 103, 104 and 105 are employed essentially to "tune in" the particular phase of the incoming samples so as to reconstruct the picture, the delay devices thus providing the same phase-displacement as the shift register 32 of the transmitting station, but in any desired sequence. Thus, it will be seen that by selective adjustment of the delay devices 102, 103, 104, 105, any particular picture from any particular camera may be displayed on any particular monitor, i.e., any picture may be displayed on any monitor or the same picture may be displayed on any or all of the monitors.

While there have been described above the principles of this invention in connection with specific apparatus, it is to be clearly understood that this description is made only by way of example and not as a limitation to the scope of the invention.

What I claim is:

1. A time division multiplex transmission system for a plurality of sequential dot interlaced raster-type signals comprising: a plurality of channels each channel including camera means and line and frame sweep means and video signal output circuit means for respectively providing sequential dot interlaced raster-type video signals; a common source of line synchronizing signals and a common source of frame synchronizing signals respectively coupled to said line and frame sweep means of said plurality of camera means for respectively synchronizing said video signals; video signal transmission means; means responsive to said common source of line-synchronizing signal for generating a plurality of trains of recurrent sampling signals equal in number to said camera means and each having a frequency $f_e=f_v(LD/n_1n_2)$ where $f_v$ is the frequency of said frame-synchronizing signals, $L$ is the number of lines in one frame, $D$ is a predetermined number of picture elements in one line, $n_1$ is the vertical interlace ratio, and $n_2$ is a predetermined dot interlace ratio, the quotient $LD/n_{12}$ being irreducible, and there being no more camera means than $n_2$; means for coupling each of said camera means output circuits to said transmission means in response to a different one of said trains of sampling signals to apply the entire sampled dot video signals from each respective camera means to said transmission means; and said generating means including means for respectively phase-displacing said trains of sampling signals whereby said sampled video signals are multiplexed.

2. The system of claim 1 wherein said coupling means includes a plurality of selectively actuable sampling gate means equal in number to said camera means and respectively coupling said output circuits to said transmission means, each of said gate means having a gating signal input circuit and means for respectively applying said trains of sampling signals to said gate means input circuits.

3. The system of claim 1 wherein said phase-displacing means phase-displaces said trains of sampling signals by a multiple of the period of a frequency $f_e n_2$.

4. The system of claim 3 further comprising a source of recurrent timing signals having a frequency $f_c=f_e n_2$, said generating means being coupled to said source and actuated thereby, $f_c$ being such that there are $D$ timing signals generated during one line.

5. The system of claim 4 wherein said generating means includes means for sequentially switching successive ones of said timing signals to $n_2$ channels, said coupling means including a plurality of selectively actuable sampling gate means equal in number to said camera means and respectively coupling said output circuits to said transmission means, each of said gate means having a gating signal input circuit, each of said input circuits being coupled to a different one of said channels and actuated by the respective train of sampling signals therein.

6. The system of claim 1 further comprising a plurality of video monitor means equal in number to said camera means and each including line and frame sweep means and video signal input circuit means; a second common source of line and frame sweep means coupled to said line and frame sweep means of all of said monitor means; means for synchronizing said second source with said first-named sources of synchronizing signals; second means for generating a plurality of second trains of recurrent sampling signals equal in number to said camera means and having the same frequency and phase displacement on said first-named plurality of trains; and second means for coupling each of said monitor means input circuit means to said transmission means in response to a different one of said second trains of sampling signals.

7. The system of claim 6 wherein said second coupling means includes a plurality of selectively actuable sampling gate means equal in number to said monitor means and respectively coupling said input circuit means to said transmission means, each of said gate means having a gating signal input circuit, and means for respectively applying said second trains of sampling signals to said second gate means input circuits.

8. The system of claim 6 further comprising a first source of recurrent timing signals having a frequency $f_c=f_e n_2$, said first-named generating means being coupled to said first timing signal source and actuated thereby and including means for phase-displacing said first-named trains of sampling signals by a multiple of the period of $f_c$; a second source of recurrent timing signals having a frequency $f_c$, said second generating means being coupled to said second timing signal source and actuated thereby and including means for phase-displacing said second trains, $f_c$ being such that there are $D$ timing signals generated during one line.

9. The system of claim 8 wherein said second timing signal source is coupled to said second synchronizing signal source and thereby maintained in synchronism with said first timing signal source.

10. The system of claim 8 wherein said second generating means includes means for sequentially switching successive ones of said second timing signals to $n_2$ channels, said second coupling means including a plurality of selectively actuable sampling gate means equal in number to said monitor means and respectively coupling said input circuit means to said transmission means, each of said gate means having a gating signal input circuit, each of said gate means input circuits being coupled to a different one of said channels and actuated by the sampling signals therein.

11. The system of claim 4 further comprising means for actuating said timing signal source thereby to initiate a train of timing signals in response to each said line-synchronizing signal, and means for terminating each said train in response to $D$ timing signals, $f_c$ being such that each interval between successive line-synchronizing signals is larger than $D$ timing signals.

12. The system of claim 8 further comprising means coupling said first-named line-synchronizing signal source to said first timing signal source for initiating a train of said first-named timing signals in response to each said first-named line-synchronizing signal; means for terminating each said train of first-named timing signals in response to $D$ timing signals, $f_c$ being such that each interval between successive line synchronizing signals is longer than D timing signals; means coupling said second synchronizing signal source to said second timing signal source for initiating a train of said second-named line-synchronizing signals; and means for terminating each said train of second-named timing signals in response to $D$ timing signals.

13. The system of claim 11 further comprising a plurality of video monitor means equal in number to said camera means and each including line and frame sweep means and video signal input circuit means; a second common source of line and frame sweep synchronizing signals coupled to said line and frame sweep means of all of said monitor means; means for synchronizing said second source with said first-named sources of synchronizing signals; second means for generating a plurality of second trains of recurrent sampling signals equal in number to said monitor means and each having the same frequency as said first-named trains; a plurality of delay means equal in number to said monitor means respectively coupling said second synchronizing signal source to said second sampling signal-generating means for respectively actuating the same to initiate said second trains of sampling signals with the same phase displacement as said first-named trains of sampling signals in response to each said second line-synchronizing signal; means for terminating each said second train of sampling signals in response to each said second line-synchronizing signal; and means for coupling each of said monitor means input circuits to said transmission means in response to a different one of said second plurality of sampling signals.

14. The system of claim 13 wherein each of said delay means is selectively adjustable.